United States Patent [19]

Nakamura

[11] Patent Number: 4,967,836
[45] Date of Patent: Nov. 6, 1990

[54] HEAT EXCHANGER AND METHOD OF MAKING A GASKET SEAL OF THE HEAT EXHANGER

[75] Inventor: Miki Nakamura, Konan, Japan

[73] Assignee: Diesel Kiki Co., Ltd., Tokyo, Japan

[21] Appl. No.: 391,112

[22] Filed: Aug. 9, 1989

[30] Foreign Application Priority Data

Sep. 6, 1988 [JP] Japan ................. 63-223226

[51] Int. Cl.$^5$ ............................................. F28F 9/02
[52] U.S. Cl. ................................................. 165/173
[58] Field of Search .................... 165/79, 173; 29/157.3 C

[56] References Cited

U.S. PATENT DOCUMENTS

| | | | |
|---|---|---|---|
| 4,651,821 | 3/1987 | Moranne | 165/173 X |
| 4,682,650 | 7/1987 | Potier | 165/173 |
| 4,705,104 | 11/1987 | Potier | 165/173 |

FOREIGN PATENT DOCUMENTS

3015350 10/1981 Fed. Rep. of Germany ...... 165/173
2250087 11/1973 France ..................... 165/173
148394 9/1983 Japan ..................... 165/173

Primary Examiner—Robert G. Nilson
Attorney, Agent, or Firm—Wenderoth, Lind & Ponack

[57] ABSTRACT

In a heat exchanger of the type having an end plate and a tank case joined together to form a tank and a plurality of tubes fitted in tube reception holes in the end plates for circulation therethrough of a heat exchange medium, with a gasket disposed between the tubes and the end plate, the gasket includes an inside portion covering one surface of the end plate facing the tank case, an outside portion covering the opposite surface facing away from the tank case, and a tubular connecting portion fitted in each of the tube reception holes and extending integrally between the inside portion and the outside portion. A method of making such a gasket is also disclosed, wherein a molten rubber compound is poured into a mold cavity in a mold with an end plate disposed within the mold cavity, thereby forming a gasket integrally molded on the end plate.

2 Claims, 3 Drawing Sheets

HEAT EXCHANGER AND METHOD OF MAKING A GASKET SEAL OF THE HEAT EXHANGER

BACKGROUND OF THE INVENTION

1. Field of the Invention

The present invention relates generally to heat exchangers for automobiles, and more particularly to a seal structure for joint portions between tanks and tubes for the passage of a heat exchanging medium, and a method of making the seal structure.

2. Description of the Prior Art

Heat exchangers of the type described include, for example as disclosed in Japanese Utility Model Laid-open Publication No. 58-158985, two confronting tanks connected together by a plurality of parallel spaced tubes each having a multiplicity of radial fins. A heat exchange medium led into one of the tanks through an inlet formed therein is circulated through the tubes via the other tank and then discharged from an outlet formed in the one tank. During circulation, the heat exchange medium is subjected to heat-exchange with air passing around the fins so that air is heated by taking up heat from the heat exchange medium.

The tanks are formed of a synthetic resin material and each composed of an end plate and a tank case joined together at their confronting peripheral edge portions, as shown in Japanese Patent Laid-open Publication No. 55-312045.

The tubes are generally made of metal such as a copper alloy and joined at their opposite ends to the end plates of the respective tanks in such a manner as shown here in FIG. 5 of the accompanying drawings.

As shown in FIG. 5, the end plate 6 has a plurality of tube reception holes 9 in which respective one ends of the tubes 2 are fitted with tubular seal lips 11$d$ of rubber seal gasket 11 disposed between the tubes 2 and the end plate 6 and then they are sealingly assembled with the end plate 6 by radially expanding the ends of the tubes 2.

Prior to this assembling operation, the sealing gasket 11 is placed on the end plate 6. However, since the seal gasket 11 made of rubber is flexible, it is difficult to fit the tubular sealing lips 11$d$ of the sealing gasket 11 simultaneously into corresponding ones of the tube reception holes 9. Further, the sealing lips 11$d$ are likely to be bent inwardly or folded by the tubes 2 when the tubes 2 are inserted into the tube reception holes 9, as shown in FIG. 6. The seal lips 11$d$ thus folded may cause a sealing failure such as leakage of the heat exchange medium.

SUMMARY OF THE INVENTION

It is accordingly an object of the present invention to provide a heat exchanger incorporating structural features which enable heat exchanger tubes to be fitted with end plates with utmost ease.

Another object of the present invention is to provide a heat exchanger having a seal gasket which is free from deformation such as bending or folding when tubes are inserted into tube reception holes in end plates, and is capable of providing a hermetic seal at joint portions between the tubes and the end plates.

A further object of the present invention is to provide a method of making a gasket seal for a heat exchanger, which method is easy to practice and capable of providing a hermetic seal at joint portions between tubes and end plates of the heat exchanger.

According to a first aspect of the present invention, there is provided a heat exchanger comprising: at least one tube for the passage therethrough of a heat exchange medium; an end plate having at least one tube reception hole into which one end of the tube is inserted; a tank case joined with the end plate to jointly constitute a tank; and a gasket fitted over the end plate and having an inside portion overlying one surface of the end plate which faces the tank case, an outside portion overlying the opposite surface of the end plate which faces away from the tank case, and a tubular connecting portion fitted in the tube reception hole and extending integrally between the inside portion and the outside portion.

With this construction, the tubular connecting portion which is fitted in the tube reception hole in the end plate is integral with the inside and outside portions lying over the opposite surfaces of the end plate, so that the tube can be inserted smoothly into the corresponding tube reception hole without causing bending or otherwise undue deformation of the gasket.

According to a second aspect of the present invention, there is provided a method of making a gasket for a heat exchanger including an end plate having a plurality of tube reception holes, the gasket having an inside portion overlying one surface of the end plate, an outside portion overlying the opposite surface of the end plate, and a tubular connecting portion fitted in each of the tube reception holes and extending integrally between the inside portion and the outside portion, the method comprising the steps of: providing a mold composed of a pair of mold members relatively movable toward and away from one another and jointly defining therebetween a mold cavity complementary in contour to the shape of the gasket when the mold is closed, one of the mold members having a sprue communicating with the mold cavity; placing an end plate in the mold cavity; pouring a molten rubber compound into the mold cavity through the sprue while the mold is closed; curing the rubber compound while keeping the closed condition of the mold, thereby forming a gasket molded on the end plate; and removing the gasket from the mold while the mold is open.

According to the method, a rubber gasket is integrally molded with the end plate in assembled condition. As a result, a tedious and time-consuming assembling operation of the gasket and the end plate can be avoided.

Many other advantages and features of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

The present invention will be described herein below in greater detail with reference to certain preferred embodiments shown in the accompanying drawings.

Figure 1:
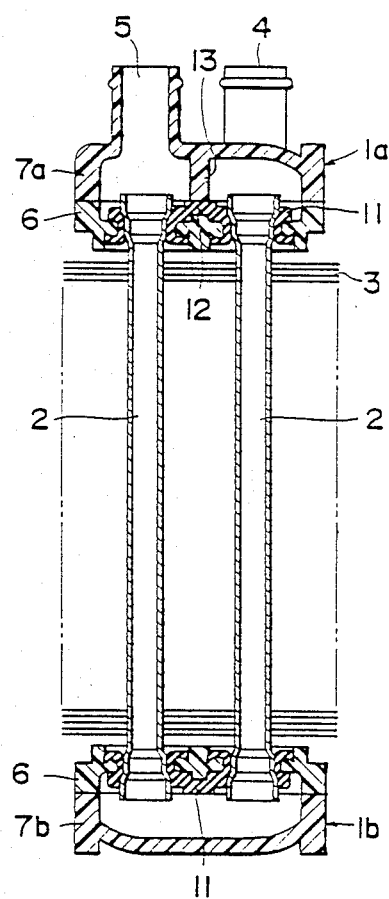
FIG. 1 is a cross-sectional view of a heat exchanger according to the present invention.
Figure 2:
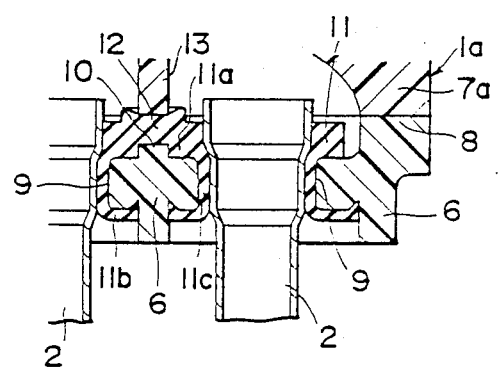
FIG. 2 is an enlarged cross-sectional view of a portion of the heat exchanger shown in FIG. 1.
Figure 3:
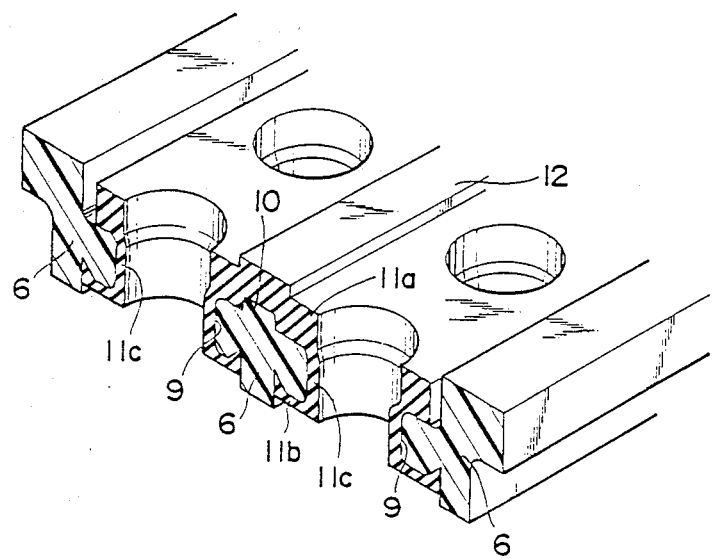
FIG. 3 is a fragmentary perspective view of an end plate of the heat exchanger.

As shown in FIGS. 1 through 3, a heat exchanger includes first and second tanks 1a, 1b and two rows of parallel spaced tubes 2, 2 (only two adjacent tubes of the tube rows being shown) joined with and extending between the first and second tanks 1a, 1b for circulation of a heat exchange medium. Each of the tubes 2 has a multiplicity of radial fins 3 along the length thereof at equal intervals. The first tank 1a has an inlet 4 from which the heat exchange medium is led into the heat exchanger. The heat exchange medium flows successively through the tube 2 (on the right side in FIG. 1), the second tank 1b and the tube 2 (on the left side in FIG. 1) into the first tank 1a from which the heat exchange medium is discharged through an outlet 5. The heat exchange medium as it circulates through the heat exchanger gives heat energy to air passing around the fins, thereby heating air.

The first and second tanks 1a, 1b are formed of a synthetic resin material and composed of an end plate 6 and respective tank cases 7a and 7b joined by fusing together along their confronting peripheral edge portions. As shown in FIG. 1, the end plate 6 is of a substantially elongate rectangular shape and has a peripheral edge portion 8 and a web portion of a reduced thickness extending inwardly of the peripheral edge portion 8. The web portion has two rows of tube reception holes 9 arranged in a longitudinal direction of the end plate 6. The tank case 7a has a partition wall 13 disposed between the two rows of tube reception holes 9 in the mating end plate 6.

Each end of one of the tubes 2 is joined with the end plate 6 with a gasket 11 disposed between the tube end and the end plate 6. The gasket 11 includes an inside portion 11a overlying a surface of the web portion of the end plate 6 at a tank interior side 6a, an outside portion 11b overlying the opposite surface of the web portion at a tank exterior side 6b, and a tubular connecting portion 11c fitted in each of the tube reception holes 9 and extending between the inside portion 11a and the outside portion 11b. The inside and outside portions 11a, 11b and the tubular connecting portion 11c are integral with each other.

The inside portion 11a of the gasket 11 extends substantially over the entire surface of the web portion of the end plate 6 and has a longitudinal ridge 12 extending in alignment with a longitudinal projection on the web of the end plate 6 for retaining thereon the partition wall 13 of the tank case 7a.

Figure 4:
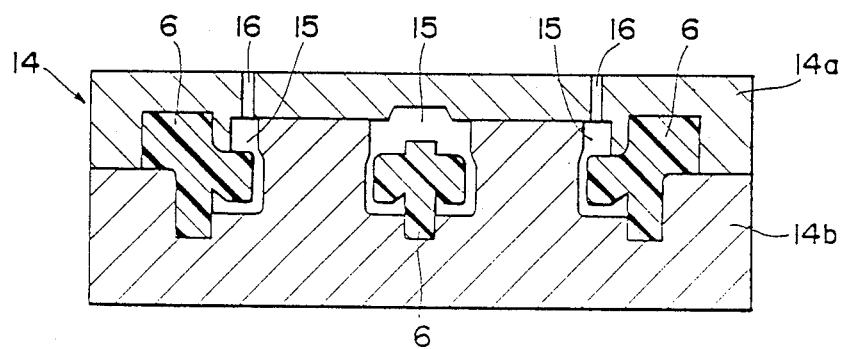
FIG. 4 is a cross-sectional view of a mold and an end plate disposed therein for the formation of a gasket molded on the end plate.
Figure 5:
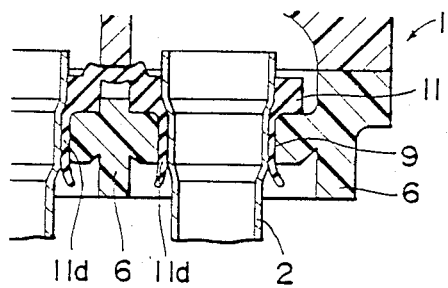
FIG. 5 is an enlarged cross-sectional view of a portion of a conventional heat exchanger.
Figure 6:
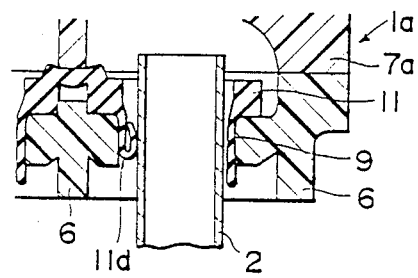
FIG. 6 is a view similar to FIG. 5, but showing a problem occurring when a tube is assembled with an end plate of the conventional heat exchanger.

The gasket 11 is molded on the end plate 6 in an assembled condition by means of a mold 14 shown in FIG. 4. The mold 14 is composed of upper and lower mold members 14a, 14b relatively movable toward and away from each other and which jointly define therebetween a mold cavity 15 complementary in contour to the shape of the gasket 11 when the mold 14 is closed.

In making the gasket 11, an end plate 6 is placed on the lower mold member 14b, then the mold 14 is closed to retain the end plate 6 within the mold cavity 15, as shown in FIG. 4. Thereafter, a molten rubber compound is poured into the mold cavity 15 through a sprue 16 formed in the upper mold plate 14a while the mold 14 is closed. While maintaining the closed condition of the mold 14, the poured rubber compound is cooled to cure it, thereby forming a gasket 11 integrally molded with the end plate 6. The mold 14 is opened, then the end plate 6 with the gasket molded on it is removed from the mold 14. The gasket 11 thus molded covers the opposite surfaces of the web portion of the end plate 6 and the inside surface of each of the tube reception holes 9, as shown in FIG. 3.

To assemble the tubes 2 with the end plate 6, one end of each of the tubes 2 is inserted into one of the tube reception holes 9 (now covered with the tubular connecting portion 11c of the gasket 11) from the exterior side 6b of the end plate 6. This insertion can be achieved smoothly and neatly even when the connecting portion 11c is thrust upwardly by the upper edge of the tube 2 because the connecting portion 11c integral with the outside portion 11b is held in position against displacement. Then the end of the tube 2 is expanded radially by means of a suitable tool such as a punch, not shown, to thereby join the tube 2 and the end plate 6 with the gasket 11 disposed therebetween.

Figure 7:
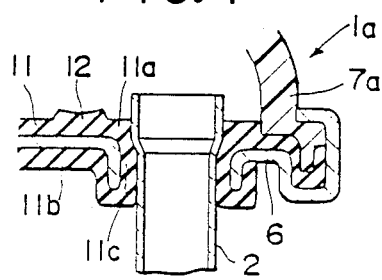
FIG. 7 is a view similar to FIG. 2, but showing a portion of a modified heat exchanger according to the present invention.

FIG. 7 shows a portion of a modified heat exchanger according to the present invention. The modified heat exchanger is substantially the same as the heat exchanger shown in FIGS. 1 through 3, except that the end plate 6 is formed of a stamped sheet metal instead of synthetic resin.

In each of the illustrated embodiments described above, the number of the tanks is two and two such tanks 1a, 1b are interconnected by the straight tubes 2, 2. According to the invention, one of the tanks 1b of the heat exchanger may be omitted in which instance the tubes 2 are bent into a U-shape having respective opposite ends received in the tube reception holes 9 in an end plate 6 of the tank 1a.

Obviously, various modifications and variations of the present invention are possible in the light of the above teaching. It is therefore to be understood that within the scope of the appended claims the invention may be practiced otherwise than as specifically described.

What is claimed is:

1. A heat exchanger comprising:
    (a) a plurality of tubes for the passage therethrough of a heat exchange medium;
    (b) an end plate having a plurality of tube reception holes into which one end of corresponding respective tubes is received;
    (c) a tank case joined with said end plate to jointly constitute a tank; and
    (d) a gasket fitted over said end plate and having an inside portion overlying substantially the entire area of one surface of said end plate which faces said tank case, an outside portion overlying substantially the entire area of the opposite surface of said end plate which faces away from said tank case, and a tubular connecting portion fitted in said tube reception holes and extending integrally between said inside portion and said outside portion.

2. A heat exchanger according to claim 1, further including an additional end plate having a plurality of tube reception holes, an additional tank case joined with said additional end plate to jointly constitute an additional tank, and an additional gasket fitted over said additional end plate and having an inside portion overlying substantially the entire area of one surface of said additional end plate which faces said additional tank case, an outside portion overlying substantially the entire area of the opposite surface of said additional end plate which faces away form said additional tank case, and a tubular connecting portion fitted in said tube reception holes in said additional end plate and extending integrally between said inside portion and said outside portion of said additional gasket, said tubes having opposite ends received in said tube reception holes in said end plate and said tube reception holes in said additional end plate, respectively.

* * * * *